(12) United States Patent
Suzuki et al.

(10) Patent No.: US 10,103,526 B2
(45) Date of Patent: Oct. 16, 2018

(54) PROTECTOR AND WIRE HARNESS

(71) Applicants:Yazaki Corporation, Tokyo (JP);
TOYOTA JIDOSHA KABUSHIKI KAISHA, Toyota-shi, Aichi-ken (JP)

(72) Inventors: Michihito Suzuki, Aichi (JP); Naotaka Sawazaki, Aichi (JP); Ikuya Takamura, Aichi (JP); Takumi Banno, Aichi (JP); Takanori Kawai, Toyota (JP); Shogo Uchiyama, Toyota (JP)

(73) Assignees: YAZAKI CORPORATION, Minato-ku, Tokyo (JP); TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 0 days.

(21) Appl. No.: 15/889,341

(22) Filed: Feb. 6, 2018

(65) Prior Publication Data

US 2018/0233887 A1 Aug. 16, 2018

(30) Foreign Application Priority Data

Feb. 10, 2017 (JP) .................................. 2017-023275

(51) Int. Cl.
*H02G 3/04* (2006.01)
*H01B 7/00* (2006.01)
*B60R 16/02* (2006.01)

(52) U.S. Cl.
CPC ............. *H02G 3/04* (2013.01); *H01B 7/0045* (2013.01); *B60R 16/0215* (2013.01)

(58) Field of Classification Search
CPC ..... H02G 3/04; H01B 7/0045; B60R 16/0215

USPC ......................................................... 174/72 A
See application file for complete search history.

(56) References Cited

U.S. PATENT DOCUMENTS

| | | | |
|---|---|---|---|
| 2005/0241715 A1* | 11/2005 | Suzuki ................ | B60R 16/0215 138/110 |
| 2012/0217033 A1* | 8/2012 | Agusa ................. | B60R 16/0215 174/68.3 |
| 2013/0206928 A1* | 8/2013 | Murakoshi .......... | B60R 16/0215 248/73 |
| 2017/0331263 A1* | 11/2017 | Matsumura .......... | H02G 3/0418 |

FOREIGN PATENT DOCUMENTS

JP 2016-119740 A 6/2016

* cited by examiner

*Primary Examiner* — Timothy Thompson
*Assistant Examiner* — Michael F McAllister
(74) *Attorney, Agent, or Firm* — Sughrue Mion, PLLC

(57) ABSTRACT

A protector applied to a wire harness includes a main body that has a main space formed along a first direction and into which a conductive main wiring material can be inserted; a movable branch that has a movable branch space communicated with the main space and into which a movable branch wiring material branched from the main wiring material can be inserted; a holding unit that can hold the movable branch wiring material inserted into the movable branch space to the movable branch; a rotation support unit that rotatably supports the movable branch relative to the main body, at a wiring position where the movable branch space is placed along a second direction and at a use position where the movable branch space is placed along a third direction; and a fixing unit that can fix the movable branch to the main body at the use position.

9 Claims, 8 Drawing Sheets

PROTECTOR AND WIRE HARNESS

CROSS-REFERENCE TO RELATED APPLICATION(S)

The present application claims priority to and incorporates by reference the entire contents of Japanese Patent Application No. 2017-023275 filed in Japan on Feb. 10, 2017.

BACKGROUND OF THE INVENTION

1. Field of the Invention

The present invention relates to a protector and a wire harness.

2. Description of the Related Art

For example, Japanese Patent Application Laid-open No. 2016-119740 discloses a protector for protecting a portion of an electric wire group where the electric wire group is bent and disposed in a plurality of directions, as a conventional protector for a wire harness to be mounted on a vehicle and the like. The protector includes a first curved-portion protection unit, a second curved-portion protection unit, a first lid, a second lid, a first locking unit, and a second locking unit. The first curved-portion protection unit protects a first curved portion of the electric wire group that curves in a horizontal direction. The second curved-portion protection unit integrally extends from the first curved-portion protection unit, and protects a second curved portion of the electric wire group that curves in a downward direction. The first lid closes an opening surface of the first curved-portion protection unit. The second lid closes an opening surface of the second curved-portion protection unit. The first locking unit is provided on the other end of the first curved-portion protection unit, and positions one end of a first corrugated tube for protecting the electric wire group or the electric wire group. The first lid is integrally joined to an upper edge part of a side surface of the first curved-portion protection unit via a hinge. A first lid-closing unit provided between the first lid and the first curved-portion protection unit locks the first lid when the first lid is closed. The second lid is integrally formed with the first lid on the same plane such that the second lid can be bent relative to the first lid, and closes the second curved-portion protection unit by being bent downward when the first lid is closed. A second lid closing unit that is provided between the second lid and the second curved-portion protection unit locks the second lid. The second locking unit is provided on an end at a side opposite from the joining side of the second lid to the first lid. The second locking unit positions one end of a second corrugated tube for protecting the electric wire group that is to be housed in the first curved-portion protection unit or the electric wire group.

For example, there is still room for improvement in the protector disclosed in Japanese Patent Application Laid-open No. 2016-119740 described above in terms of improving the assembling workability.

SUMMARY OF THE INVENTION

The present invention has been made in view of the above circumstances and an object of the present invention is to provide a protector and a wire harness that can improve the assembling workability.

In order to achieve the above mentioned object, a protector according to one aspect of the present invention includes a main body unit that includes a main space portion formed along a first direction and into which a conductive main wiring material is capable of being inserted; a movable branch unit that includes a movable branch space portion communicated with the main space portion and into which a movable branch wiring material branched from the main wiring material is capable of being inserted; a holding unit that is capable of holding the movable branch wiring material inserted into the movable branch space portion to the movable branch unit; a rotation support unit that rotatably supports the movable branch unit relative to the main body unit, at a wiring position where the movable branch space portion is placed along a second direction that is different from the first direction and at a use position where the movable branch space portion is placed along a third direction that is different from the first direction and the second direction; and a fixing unit that is capable of fixing the movable branch unit to the main body unit at the use position.

According to another aspect of the present invention, in the protector, it is possible to configure that a fixed branch unit that includes a fixed branch space portion communicated with the main space portion and into which a fixed branch wiring material branched from the main wiring material is capable of being inserted, and is fixed to the main body unit at a position where the fixed branch space portion is placed along a virtual plane that is placed along the first direction and the second direction.

According to still another aspect of the present invention, in the protector, it is possible to configure that the holding unit includes a rotating cover that is rotatably supported relative to the movable branch unit, at an opening position where at least a part of the movable branch space portion is opened and at a closing position where the part of the movable branch space portion is closed and the movable branch wiring material along with a covering material of the movable branch wiring material are held to the movable branch unit.

According to still another aspect of the present invention, in the protector, it is possible to configure that the movable branch unit is fixed to the main body unit at the use position via the fixing unit, in a state where the movable branch wiring material is inserted into the movable branch space portion and is held to the movable branch unit by the holding unit.

In order to achieve the above mentioned object, a wire harness according to still another aspect of the present invention includes a conductive main wiring material; a movable branch wiring material branched from the main wiring material; and a protector that is attached to the main wiring material and the movable branch wiring material, and that protects the main wiring material and the movable branch wiring material, wherein the protector includes: a main body unit into which the main wiring material is inserted along a first direction; a movable branch unit into which the movable branch wiring material is inserted; a holding unit that holds the movable branch wiring material inserted into the movable branch unit to the movable branch unit; a rotation support unit that rotatably supports the movable branch unit relative to the main body unit, at a wiring position where the movable branch wiring material is placed along a second direction that is different from the first direction and at a use position where the movable branch wiring material is placed along a third direction that is different from the first direction and the second direction;

and a fixing unit that is capable of fixing the movable branch unit to the main body unit at the use position, and the movable branch unit is fixed to the main body unit at the use position via the fixing unit, in a state where the movable branch wiring material is inserted into the movable branch unit and is held to the movable branch unit by the holding unit.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENT

Hereinafter, an embodiment according to the present invention will be described in detail with reference to the accompanying drawings. It is to be noted that the invention is not limited to the embodiment. Moreover, components in the following embodiment include those that can be easily replaced by those skilled in the art, or that are substantially equivalent.

Figure 6:
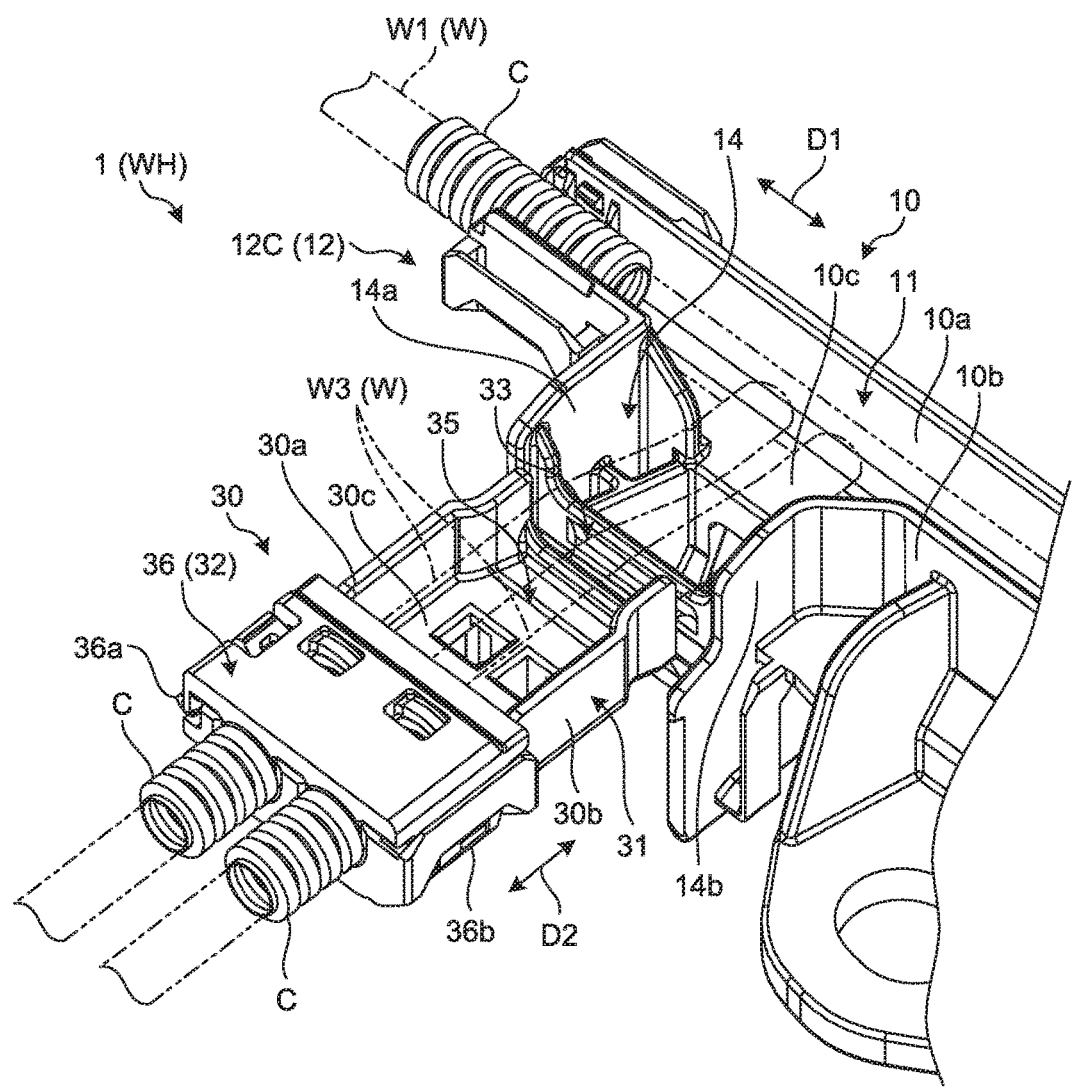
FIG. 6 is a partial perspective view illustrating a schematic configuration of the movable wiring unit of the protector according to the embodiment.

In the drawings to be described below, to make the drawings easy to understand, the wiring material is simply illustrated by a two-dot chain line and the covering material is partially illustrated in FIG. 1, FIG. 6, and FIG. 8. The illustration of the wiring material is omitted and the covering material is partially illustrated in FIG. 3. The illustrations of the wiring material and the covering material are omitted in the other drawings. Moreover, FIG. 1, FIG. 7, and FIG. 8 each illustrate a state when a movable branch unit is placed at a use position, and FIG. 2, FIG. 3, FIG. 4, FIG. 5, and FIG. 6 each illustrate a state when the movable branch unit is placed at a wiring position.

Embodiment

Figure 1:
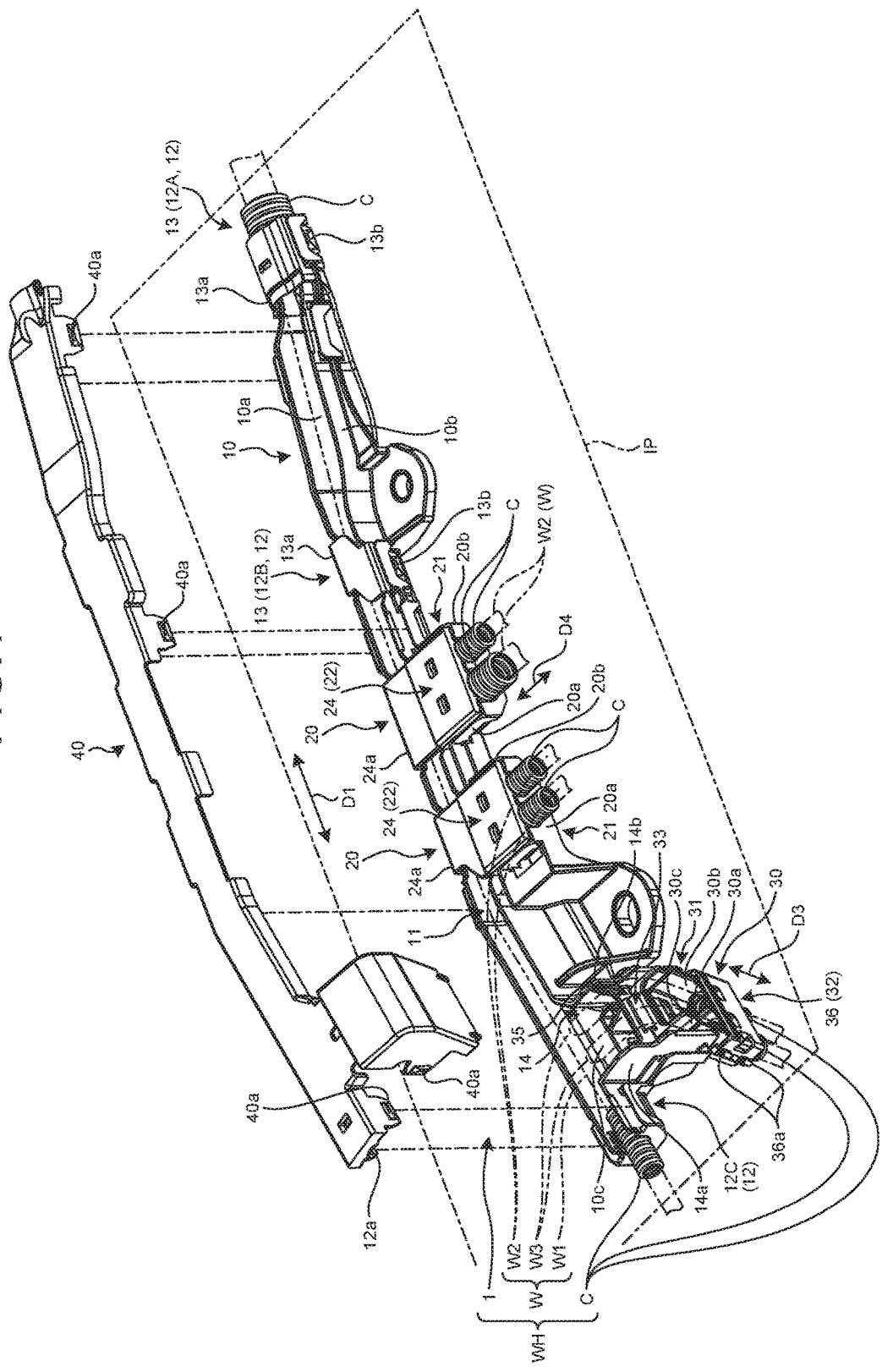
FIG. 1 is an exploded perspective view illustrating a schematic configuration of a protector according to an embodiment.

A protector 1 illustrated in FIG. 1 is mounted on a vehicle such as an automobile, incorporated into a wire harness WH, covers a conductive wiring material W, and protects the wiring material W. In this example, the wire harness WH is an assembly in which a plurality of the wiring materials W used for supplying electric power and signal communication, are bundled to connect devices mounted on a vehicle, for example. The wiring materials W are connected to the devices via a connector and the like. The wire harness WH includes the conductive wiring materials W, a covering material C through which the wiring materials W are to be inserted, and the protector 1 that is attached to the wiring materials W and that protects the wiring materials W. For example, the wiring materials W include a metal rod, an electric wire, an electric wire bundle, and the like. The metal rod is obtained by covering the outside of a conductive rod-shaped member with an insulating covering part. The electric wire is obtained by covering the outside of a conductor part (core wire) made of a plurality of conductive metal strands with an insulating covering part. The electric wire bundle is obtained by bundling the electric wires. The covering material C covers the wiring materials W when the wiring materials W are inserted therethrough, and protects the wiring materials W by covering the outer peripheral side of the wiring materials W. For example, the covering material C is a corrugated tube that is formed of an insulating resin material, that has a substantially cylindrical shape having flexibility, and the outer surface of which has a bellows shape. The protector 1 holds an end of the covering material C. The wiring material W of the present embodiment includes a main wiring material W1 as well as a fixed branch wiring material W2 and a movable branch wiring material W3 that are branched from the main wiring material W1. The main wiring material W1 is the primary wiring material W serving as a main line, and is formed so as to extend in a linear manner. The fixed branch wiring material W2 and the movable branch wiring material W3 are wiring materials W that are branch lines branched from the middle location of the main wiring material W1, and are formed so as to extend in a linear manner. The protector 1 is attached to the main wiring material W1, the fixed branch wiring material W2, and the movable branch wiring material W3, and protects the main wiring material W1, the fixed branch wiring material W2, and the movable branch wiring material W3. In the wire harness WH of the present embodiment, the protector 1 is assembled to the wiring material W including the main wiring material W1, the fixed branch wiring material W2, and the movable branch wiring material W3. In the protector 1, the fixed branch wiring material W2 is disposed in a fixed wiring unit 20, and the movable branch wiring material W3 is disposed in a movable wiring unit 30. With this configuration, the protector 1 and the wire harness WH can improve the assembling workability. Hereinafter, a configuration of the protector 1 will be described in detail with reference to the accompanying drawings. The wire harness WH may also include a grommet, a fixing tool, a connector, and the like.

Figure 2:
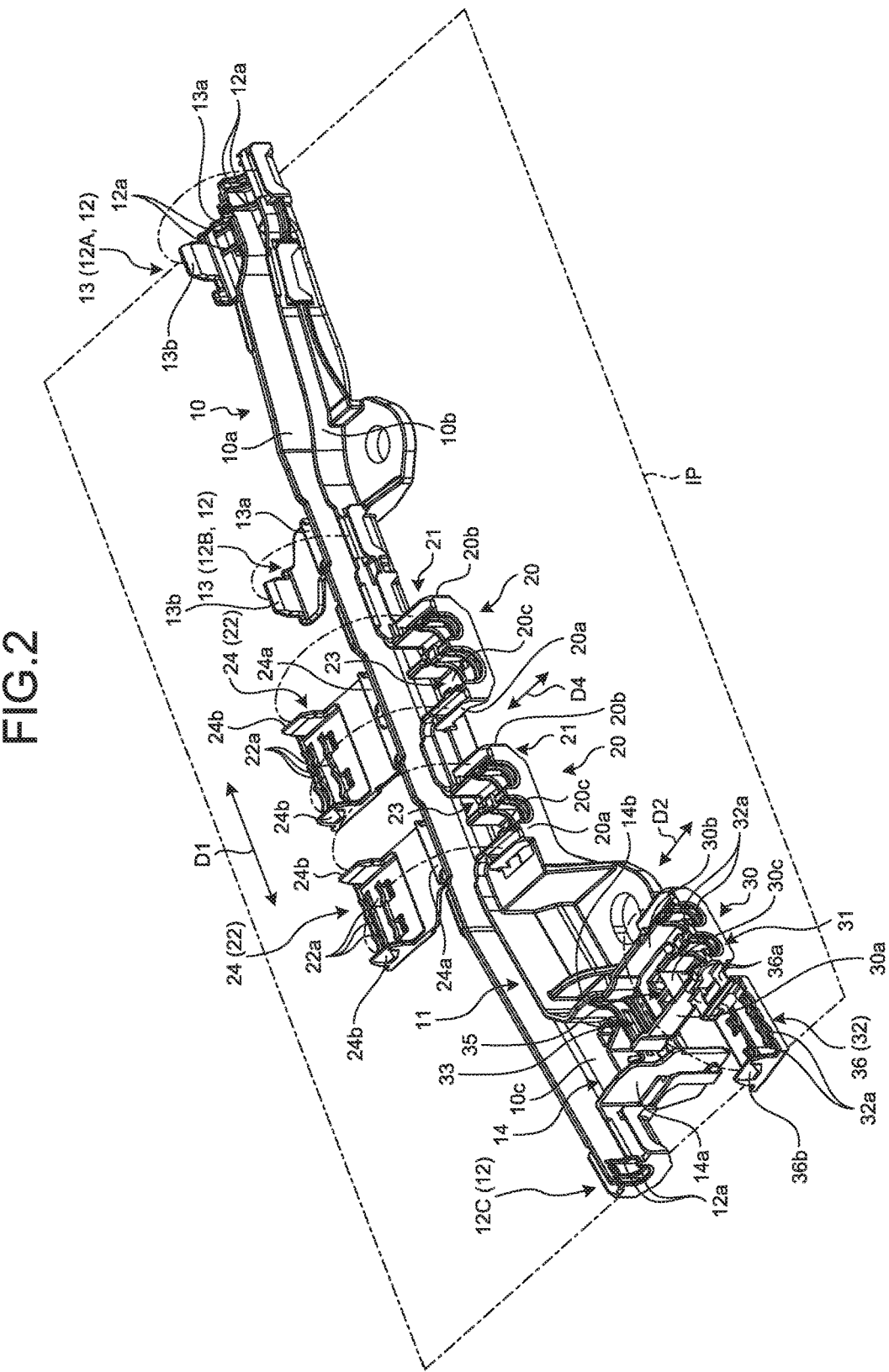
FIG. 2 is a perspective view illustrating a schematic configuration of a main body unit, a fixed wiring unit, and a movable wiring unit of the protector according to the embodiment.
Figure 3:
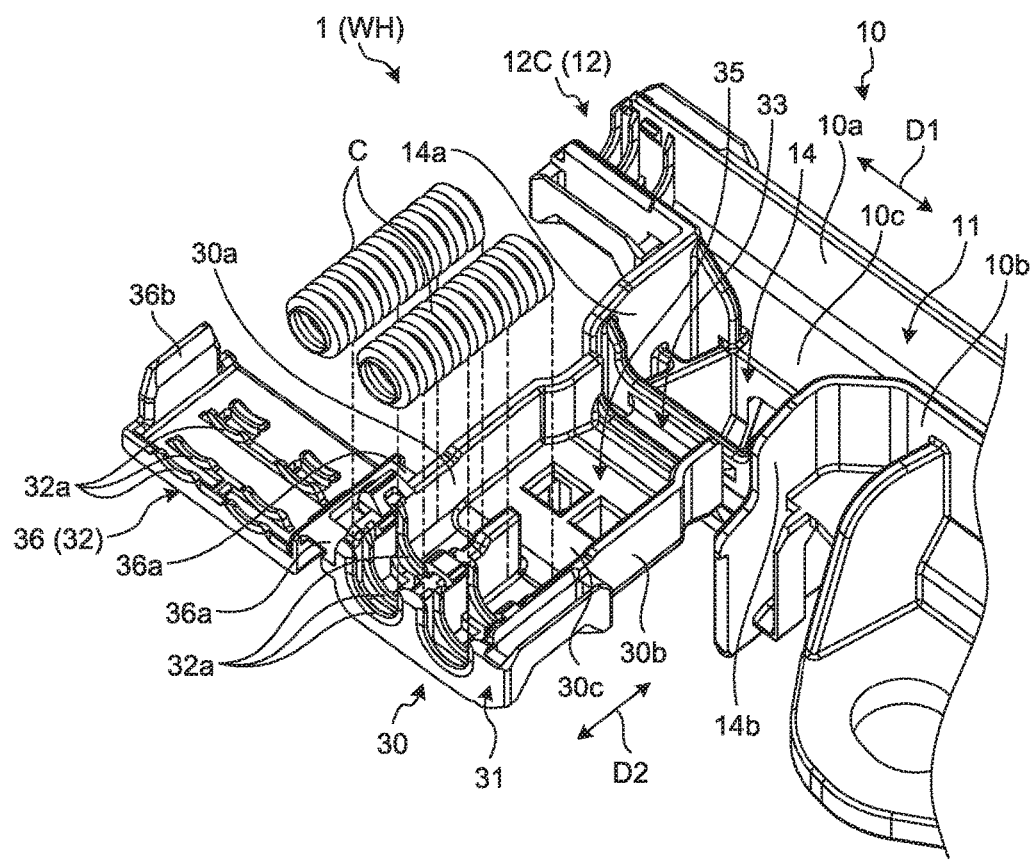
FIG. 3 is a partial exploded perspective view illustrating a schematic configuration of the movable wiring unit of the protector according to the embodiment.
Figure 4:
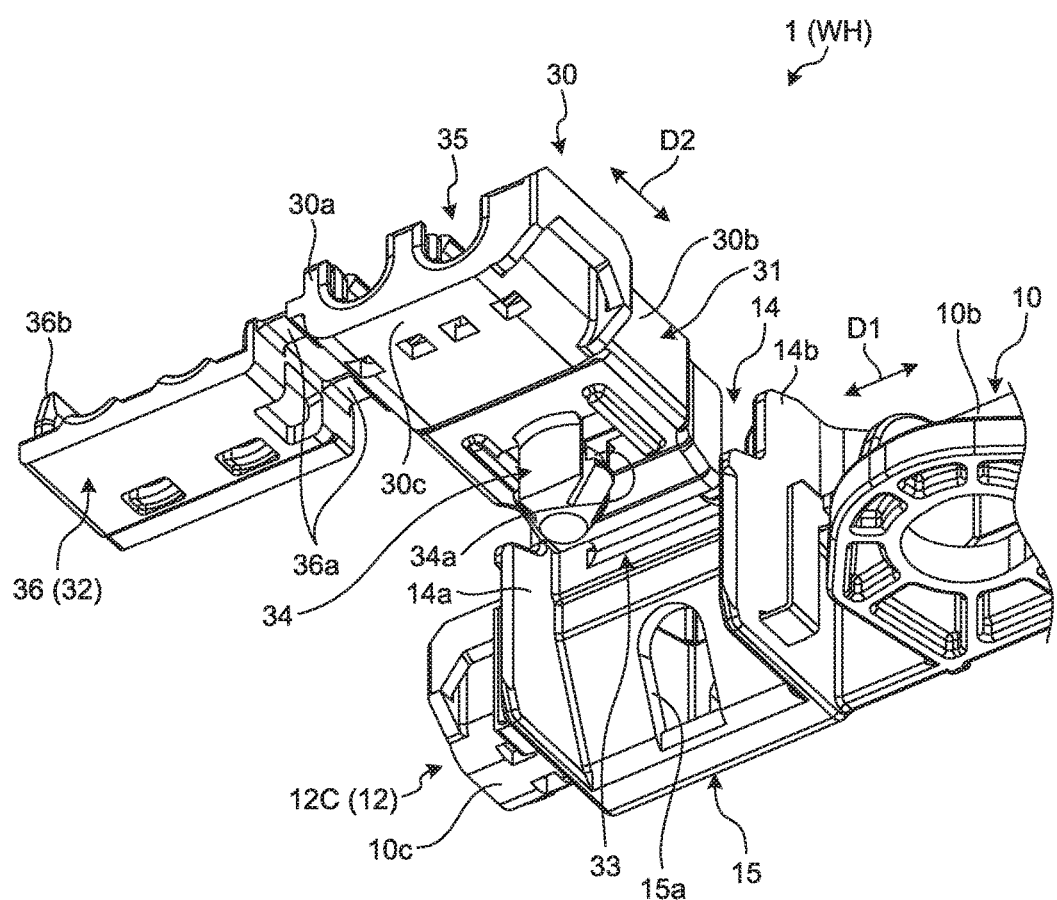
FIG. 4 is a partial perspective view illustrating a schematic configuration of the movable wiring unit of the protector according to the embodiment.
Figure 5:
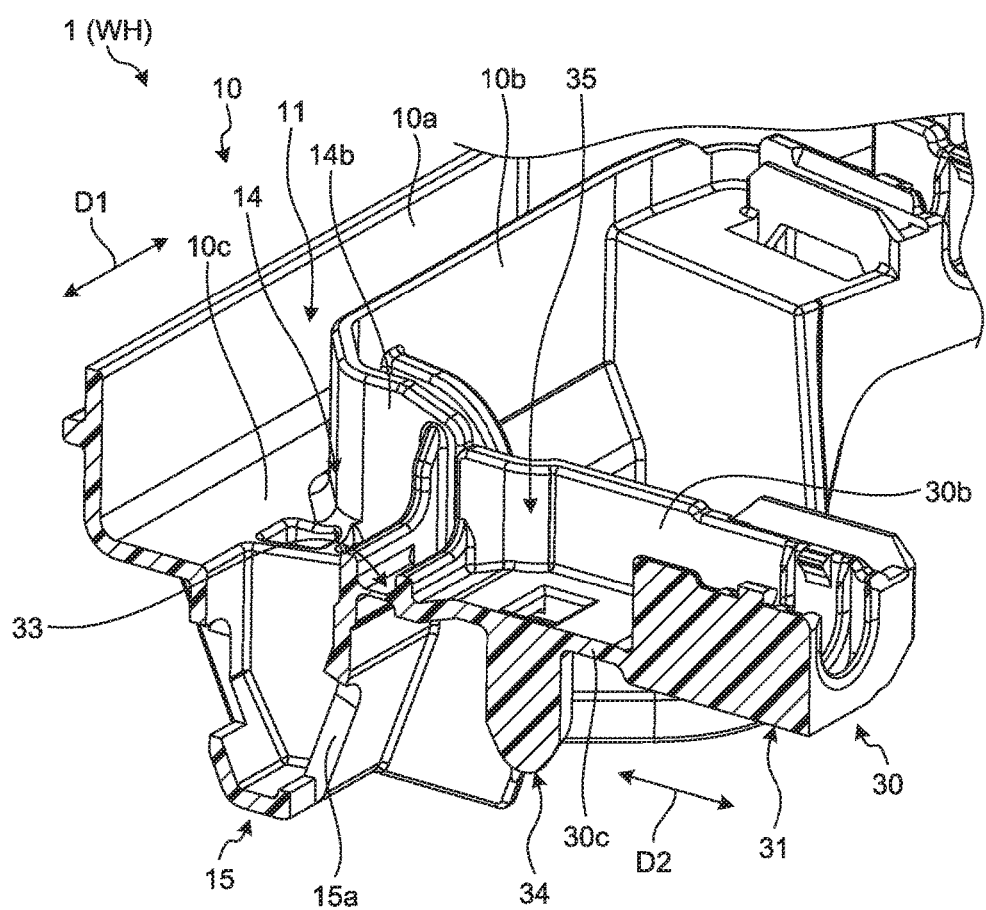
FIG. 5 is a partial sectional perspective view illustrating a schematic configuration of the movable wiring unit of the protector according to the embodiment.

More specifically, as illustrated in FIG. 1 and FIG. 2, the protector 1 includes a main body unit 10, the fixed wiring unit 20, the movable wiring unit 30, and a cover 40. In the protector 1, the cover 40 is assembled so as to cover the main body unit 10 and the movable wiring unit 30, while the main wiring material W1 is disposed in the main body unit 10, the fixed branch wiring material W2 is disposed in the fixed wiring unit 20, and the movable branch wiring material W3 is disposed in the movable wiring unit 30. The protector 1 of the present embodiment includes two fixed wiring units 20 and a single movable wiring unit 30. In the protector 1, the main body unit 10, the fixed wiring unit 20, and the movable wiring unit 30 are integrally formed of an insulating resin material to configure a protector main body. The cover 40 is separately formed of an insulating resin material from the protector main body.

As illustrated in FIG. 1 and FIG. 2, the main body unit 10 is a portion in which the main wiring material W1 is disposed along a first direction D1. The main body unit 10 includes a main space portion 11 and a holding unit 12, and the main space portion 11 and the holding unit 12 are integrally formed into the main body unit 10. The main body unit 10 includes a pair of side wall portions 10a and 10b and a bottom portion 10c. The pair of side wall portions 10a and 10b and the bottom portion 10c are integrally formed into a substantially gutter shape, and configure the main space portion 11. In the main body unit 10, various rib parts and uneven parts are also formed on the side wall portions 10a and 10b and the bottom portion 10c.

The main space portion 11 is a space portion formed along the first direction D1, and through which the conductive main wiring material W1 can penetrate. The main space portion 11 is configured by the pair of side wall portions 10a and 10b and the bottom portion 10c. The pair of side wall portions 10a and 10b are wall bodies for partitioning the inner space portion of the main body unit 10. The bottom portion 10c is a bottom body for partitioning the inner space portion of the main body unit 10. The pair of side wall portions 10a and 10b and the bottom portion 10c are formed so as to extend along the first direction D1 in a substantially linear manner. The pair of side wall portions 10a and 10b are each formed in a plate shape, and are facing each other in a direction perpendicular to the first direction D1 with an interval therebetween. The bottom portion 10c is formed in a plate shape, interposed between the pair of side wall portions 10a and 10b, and joins one end of each of the pair of side wall portions 10a and 10b along the first direction D1 with each other. In other words, the pair of side wall portions 10a and 10b are formed so as to project and stand upright from both ends of the bottom portion 10c in the direction perpendicular to the first direction D1. In the main body unit 10, an inner space portion surrounded by the pair of side wall portions 10a and 10b and the bottom portion 10c configures the main space portion 11. In other words, the main space portion 11 is partitioned by the pair of side wall portions 10a and 10b and the bottom portion 10c. In the main body unit 10, both ends of the main space portion 11 in the first direction D1 and a surface facing the bottom portion 10c are opened. In other words, both ends of the main space portion 11 along the first direction D1 are communicated with the outside, and the surface facing the bottom portion 10c is communicated with the outside. The main wiring material W1 is inserted from one opening to the other opening of the main space portion 11 of the main body unit 10, along the first direction D1 in a substantially linear manner. In other words, the main body unit 10 covers the main wiring material W1 when the main wiring material W1 is inserted into the main space portion 11 along the first direction D1, and protects the main wiring material W1 by the pair of side wall portions 10a and 10b and the bottom portion 10c. Moreover, in the main body unit 10, the cover 40, which will be described below, closes the opening facing the bottom portion 10c of the main space portion 11, after the main wiring material W1 is disposed in the main space portion 11.

The holding unit 12 is a portion that is capable of holding the main wiring material W1 that is inserted into the main space portion 11 of the main body unit 10 to the main body unit 10. In this example, the holding unit 12 includes a first holding unit 12A, a second holding unit 12B, and a third holding unit 12C. The first holding unit 12A is provided on one end of the main body unit 10 in the first direction D1. The second holding unit 12B is provided on a middle part of the main body unit 10 in the first direction D1. The third holding unit 12C is provided on the other end of the main body unit 10 in the first direction D1. The first holding unit 12A and the second holding unit 12B each include a rotating cover 13. The rotating cover 13 is rotatably supported relative to the side wall portion 10a of the main body unit 10, at an opening position and a closing position. The opening position of the rotating cover 13 is a position where a part of the main space portion 11 of the main body unit 10 is opened. On the other hand, the closing position of the rotating cover 13 is a position where the part of the main space portion 11 of the main body unit 10 is closed, and where the main wiring material W1 is held in the main space portion 11 of the main body unit 10. For example, each of the rotating covers 13 is joined to the side wall portion 10a of the main body unit 10 via a hinge 13a and the like. The hinge 13a forms a rotating axis along the first direction D1, and rotatably supports the entire rotating cover 13 around the rotating axis relative to the side wall portion 10a. Moreover, the rotating cover 13 includes a locking claw 13b and the like, and is kept while the main wiring material W1 is held in the main space portion 11, when the locking claw 13b is locked to the side wall portion 10b of the main body unit 10 at the closing position. The rotating cover 13 closes a part of the opening of the surface facing the bottom portion 10c of the main space portion 11 while the rotating cover 13 is locked to the closing position. On the other hand, the third holding unit 12C holds the main wiring material W1 in the main space portion 11 of the main body unit 10, by a part of the cover 40, which will be described below. In other words, a part of the cover 40 is commonly used by the third holding unit 12C. The third holding unit 12C holds the main wiring material W1 in the main space portion 11 of the main body unit 10 by the cover 40, while the cover 40 is closing the opening facing the bottom portion 10c of the main space portion 11. Moreover, in this example, the first holding unit 12A and the third holding unit 12C are also used as a covering material holding unit for holding the end of the covering material C. In the first holding unit 12A and the third holding unit 12C, a plurality of holding rib parts 12a are formed on the inner wall surface at the main space portion 11 side, on the portions respectively corresponding to the rotating cover 13 and the cover 40 (in other words, the end in the first direction D1). Furthermore, the holding rib parts 12a are formed on the inner wall surface at the main space portion 11 side, at portions facing the rotating cover 13 and the cover 40 placed at the closing position (in other words, both ends in the first direction D1), in the side wall portions 10a and 10b and the bottom portion 10c. Each of the holding rib parts 12a has a curved-shape corresponding to the outer peripheral shape of the covering material C, and holds the covering material C by being meshed with the uneven parts formed on the outer surface of the covering material C. The first holding unit 12A and the third holding unit 12C keep the main wiring material W1 in the main body unit 10 with the covering material C of the main wiring material W1, via the holding rib parts 12a.

As illustrated in FIG. 1 and FIG. 2, the fixed wiring unit 20 is a portion in which the fixed branch wiring material W2 is disposed along a fourth direction D4 that is different from the first direction D1 (a second direction D2 and a third direction D3 will be described below). In this example, two fixed wiring units 20 are provided between the second holding unit 12B and the third holding unit 12C relative to the first direction D1. In this example, although the shapes and the like of the two fixed wiring units 20 are slightly different from each other, basically, the two fixed wiring units 20 have substantially the same configuration. Thus, in the following, unless otherwise specified, the two fixed wiring units 20 are commonly explained. The fixed wiring unit 20 includes a fixed branch unit 21 and a holding unit 22, and the fixed branch unit 21 and the holding unit 22 are integrally formed into the fixed wiring unit 20.

The fixed branch unit 21 includes a fixed branch space portion 23. The fixed branch unit 21 includes a pair of side wall portions 20a and 20b and a bottom portion 20c. The pair of side wall portions 20a and 20b and the bottom portion 20c are integrally formed into a substantially gutter shape, and configure the fixed branch space portion 23. In the fixed branch unit 21, various rib parts and uneven parts are also formed on the side wall portions 20a and 20b and the bottom portion 20c. The fixed branch space portion 23 is a space portion that communicates with the main space portion 11, that is formed along the fourth direction D4 perpendicular to the first direction D1, and through which the fixed branch wiring material W2 branched from the main wiring material W1 can penetrate. The fixed branch space portion 23 is configured by the pair of side wall portions 20a and 20b and the bottom portion 20c. The pair of side wall portions 20a and 20b are wall bodies for partitioning the inner space portion of the fixed branch unit 21. The bottom portion 20c is a bottom body for partitioning the inner space portion of the fixed branch unit 21. The pair of side wall portions 20a and 20b and the bottom portion 20c are formed so as to extend along the fourth direction D4 in a substantially linear manner. The pair of side wall portions 20a and 20b are each formed in a plate shape, and are facing each other in a direction perpendicular to the fourth direction D4 with an interval therebetween. The bottom portion 20c is formed in a plate shape, interposed between the pair of side wall portions 20a and 20b, and joins one end of each of the pair of side wall portions 20a and 20b along the fourth direction D4 with each other. In other words, the pair of side wall portions 20a and 20b are formed so as to project and stand upright from both ends of the bottom portion 20c in the direction perpendicular to the fourth direction D4. In the fixed branch unit 21, an inner space portion surrounded by the pair of side wall portions 20a and 20b and the bottom portion 20c configures the fixed branch space portion 23. In other words, the fixed branch space portion 23 is partitioned by the pair of side wall portions 20a and 20b and the bottom portion 20c. In the fixed branch unit 21, both ends of the fixed branch space portion 23 in the fourth direction D4 and a surface facing the bottom portion 20c are opened. In other words, one of the ends of the fixed branch space portion 23 in the fourth direction D4 is communicated with the main space portion 11, the other end of the fixed branch space portion 23 is communicated with the outside, and a surface facing the bottom portion 20c is communicated with the outside. The fixed branch unit 21 is fixed to the main body unit 10, when the ends of the pair of side wall portions 20a and 20b and the bottom portion 20c at the main space portion 11 side are connected to the side wall portion 10b and the bottom portion 10c, respectively. In the fixed branch space portion 23 of the fixed branch unit 21, the fixed branch wiring material W2 branched from the main wiring material W1 is inserted from the main space portion 11 side to the outside along the fourth direction D4 in a substantially linear manner. The fixed branch unit 21 is fixed to the main body unit 10 at a position where the fixed branch space portion 23 is placed along the fourth direction D4, and where the fixed branch wiring material W2 that is inserted into the fixed branch space portion 23 is placed along the fourth direction D4. In other words, the fixed branch unit 21 covers the fixed branch wiring material W2, when the fixed branch wiring material W2 is inserted into the fixed branch space portion 23 along the fourth direction D4, and protects the fixed branch wiring material W2 by the pair of side wall portions 20a and 20b and the bottom portion 20c. In this example, in the fixed branch unit 21, the two fixed branch wiring materials W2 are inserted into the fixed branch space portion 23 along a direction perpendicular to the fourth direction D4 with an interval therebetween. The fourth direction D4 will be described in detail below.

The holding unit 22 is a portion that is capable of holding the fixed branch wiring material W2 that is inserted into the fixed branch space portion 23 of the fixed branch unit 21 to the fixed branch unit 21. The holding unit 22 of the present embodiment includes a rotating cover 24. The rotating cover 24 is rotatably supported relative to the side wall portion 10a of the main body unit 10, at an opening position and a closing position. The opening position of the rotating cover 24 is a position where a part of the fixed branch space portion 23 of the fixed branch unit 21 is opened. On the other hand, the closing position of the rotating cover 24 is a position where the part of the fixed branch space portion 23 of the fixed branch unit 21 is closed, and where the fixed branch wiring material W2 is held in the fixed branch space portion 23 of the fixed branch unit 21. For example, the rotating cover 24 is joined to a portion facing the fixed branch unit 21 in the side wall portion 10a of the main body unit 10 via a hinge 24a and the like. The hinge 24a forms a rotating axis along the first direction D1, and rotatably supports the entire rotating cover 24 around the rotating axis relative to the side wall portion 10a. Moreover, the rotating cover 24 includes a pair of locking claws 24b and the like, and is kept while the fixed branch wiring material W2 is held in the fixed branch space portion 23, when the locking claws 24b are locked to the side wall portions 20a and 20b of the fixed branch unit 21, respectively, at the closing position. The rotating cover 24 closes the opening of the surface facing the bottom portion 20c of the fixed branch space portion 23, while the rotating cover 24 is locked to the closing position. In this example, the rotating cover 24 also closes a part of the opening of the surface facing the bottom portion 10c of the main space portion 11, by the base end of the rotating cover 24 at the hinge 24a side, while the rotating cover 24 is locked to the closing position. In other words, in this example, a part of the rotating cover 24 functions as a portion that closes a part of the opening of the surface facing the bottom portion 10c of the main space portion 11, and that holds the main wiring material W1 in the main space portion 11 of the main body unit 10. The holding unit 22 is also used as a covering material holding unit for holding the end of the covering material C. In the holding unit 22, a plurality of holding rib parts 22a are formed on the inner wall surface at the fixed branch space portion 23 side, on the end of the rotating cover 24 in the fourth direction D4 at the closing position (end at the side opposite from the main space portion 11 side). Moreover, in the side wall portions 20a and 20b and the bottom portion 20c, the holding rib parts 22a are formed on the inner wall surface at the fixed branch space portion 23 side, at a portion facing the rotating cover 24 at the closing position. Each of the holding rib parts 22a is formed in a curved-shape corresponding to the outer peripheral shape of the covering material C, and holds the covering material C, by being meshed with the uneven parts formed on the outer surface of the covering material C. In this example, the holding rib parts 22a are shaped so as to be able to hold the two covering materials C along a direction perpendicular to the fourth direction D4 with an interval therebetween. The holding unit 22 keeps the fixed branch wiring material W2 in the fixed branch unit 21 with the covering material C of the fixed branch wiring material W2, via the holding rib parts 22a.

As illustrated in FIG. 1 and FIG. 2, the movable wiring unit 30 is a portion in which the movable branch wiring material W3 is disposed and that can be rotated relative to the main body unit 10 to the wiring position and the use position, while the movable branch wiring material W3 is disposed. Typically, in the wiring position illustrated in each of FIG. 2, FIG. 3, FIG. 4, FIG. 5, and FIG. 6, the movable branch wiring material W3 is disposed in the movable wiring unit 30 along the second direction D2. Then, the movable wiring unit 30 is rotated to the use position illustrated in FIG. 1, FIG. 7, and FIG. 8, and the wire direction of the movable branch wiring material W3 is set along the third direction D3. The movable wiring unit 30 includes a movable branch unit 31, a holding unit 32, a rotation support unit 33, and a fixing unit 34, and the movable branch unit 31, the holding unit 32, the rotation support unit 33, and the fixing unit 34 integrally form the movable wiring unit 30.

The movable branch unit 31 includes a movable branch space portion 35. The movable branch unit 31 includes a pair of side wall portions 30a and 30b and a bottom portion 30c. The pair of side wall portions 30a and 30b and the bottom portion 30c are integrally formed into a substantially gutter shape, and configure the movable branch space portion 35. In the movable branch unit 31, various rib parts and uneven parts are also formed on the side wall portions 30a and 30b and the bottom portion 30c. The movable branch space portion 35 is a space portion that communicates with the main space portion 11 and through which the movable branch wiring material W3 branched from the main wiring material W1 can penetrate. The movable branch space portion 35 is placed along the second direction D2 that is different from the first direction D1 and the fourth direction D4, while the movable branch unit 31 is placed at the wiring position. Moreover, the movable branch space portion 35 is placed along the third direction D3 that is different from the first direction D1, the second direction D2, and the fourth direction D4, while the movable branch unit 31 is placed at the use position.

In this example, the first direction D1, the second direction D2, and the fourth direction D4 are directions along a virtual plane IP (see FIG. 1 and FIG. 2) as well as directions different from one another. In other words, the virtual plane IP is a plane along the first direction D1, the second direction D2, and the fourth direction D4. That is, the fixed branch unit 21 described above is fixed to the main body unit 10, at a position where the fixed branch space portion 23 is placed along the virtual plane IP, and where the fixed branch wiring material W2 that is inserted into the fixed branch space portion 23 is placed along the virtual plane IP. Typically, the virtual plane IP is a two-dimensional plane along a work surface of what is called a jig board and the like used for mounting the protector 1, the wiring material W, and the like when the wiring material W is to be disposed on the protector 1 in the wire harness WH. In other words, typically, in the wire harness WH, the wiring material W can be disposed in a two-dimensional manner on the work surface such as the jig board, when the wiring material W is to be disposed in the first direction D1, the second direction D2, and the fourth direction D4 along the virtual plane IP. On the other hand, the third direction D3 is a direction perpendicular to the virtual plane IP, and is a direction perpendicular to the work surface such as the jig board in a three-dimensional manner. In other words, in the wire harness WH, when the wiring material W is to be disposed along the third direction D3, the wiring material W is disposed in a three-dimensional manner relative to the work surface such as a jig board. In this case, as described above, in the wire harness WH of the present embodiment, the wiring material W can be easily disposed in a three-dimensional manner, by disposing the wiring material W while the movable branch unit 31 is placed at the wiring position, and then rotating the movable branch unit 31 to the use position with the wiring material W (movable branch wiring material W3).

The movable branch space portion 35 is configured by the pair of side wall portions 30a and 30b and the bottom portion 30c. The pair of side wall portions 30a and 30b are wall bodies for partitioning the inner space portion of the movable branch unit 31. The bottom portion 30c is a bottom body for partitioning the inner space portion of the movable branch unit 31. The pair of side wall portions 30a and 30b and the bottom portion 30c are formed so as to extend along a certain direction perpendicular to the first direction D1 in a substantially linear manner. In this example, the certain direction perpendicular to the first direction D1 is a direction along the second direction D2 at the wiring position, and a direction along the third direction D3 at the use position, and in the following, may be simply referred to as a "certain direction" unless otherwise specified. The pair of side wall portions 30a and 30b are each formed in a plate shape, and facing each other in a direction perpendicular to the certain direction with an interval therebetween. The bottom portion 30c is formed in a plate shape, interposed between the pair of side wall portions 30a and 30b, and joins one end of each of the pair of side wall portions 30a and 30b along the second direction D2 with each other. In other words, the pair of side wall portions 30a and 30b are formed so as to project and stand upright from both ends of the bottom portion 30c in the direction perpendicular to the certain direction. In the movable branch unit 31, an inner space portion surrounded by the pair of side wall portions 30a and 30b and the bottom portion 30c configures the movable branch space portion 35. In other words, the movable branch space portion 35 is partitioned by the pair of side wall portions 30a and 30b and the bottom portion 30c. In the movable branch unit 31, both ends of the movable branch space portion 35 in the certain direction and a surface facing the bottom portion 30c are opened. In other words, in the movable branch space portion 35, one of the ends along the certain direction is communicated with the main space portion 11, the other end is communicated with the outside, and a surface facing the bottom portion 30c is communicated with the outside. In this example, the movable branch space portion 35 is communicated with the main space portion 11 via a connection part 14 formed in the main body unit 10. The connection part 14 is a portion obtained by cutting a part of the side wall portion 10b of the main body unit 10, and where the bottom portion 10c is projecting out along the second direction D2. The connection part 14 includes a pair of wall portions 14a and 14b. The pair of wall portions 14a and 14b are formed so as to interpose the bottom portion 10c projecting out along the second direction D2, relative to the first direction D1. The movable branch space portion 35 is communicated with the main space portion 11 via the pair of wall portions 14a and 14b of the connection part 14. In the movable branch unit 31, the ends of the pair of the side wall portions 30a and 30b and the bottom portion 30c at the main space portion 11 side are formed so as to separate from the side wall portions 10a and 10b, the bottom portion 10c, the wall portions 14a and 14b, and the like of the main body unit 10, respectively. Consequently, the movable branch unit 31 can be rotated relative to the main body unit 10. In the movable branch space portion 35 of the movable branch unit 31, the movable branch wiring material W3 branched from the main wiring material W1 is inserted from the main space portion 11 side to the outside along the certain direction in a substantially linear manner. In the movable branch space portion 35, the movable branch wiring material W3 is inserted along the second direction D2 at the wiring position. In the movable branch space portion 35, the movable branch wiring material W3 is inserted along the third direction D3 at the use position. In other words, the movable branch unit 31 covers the movable branch wiring material W3 when the movable branch wiring material W3 is inserted into the movable branch space portion 35 along the certain direction, and protects the movable branch wiring material W3 by the pair of side wall portions 30a and 30b and the bottom portion 30c. In this example, in the movable branch unit 31, two of the movable branch wiring materials W3 are inserted into the movable branch space portion 35 along a direction perpendicular to the certain direction with an interval therebetween.

The holding unit 32 is a portion that is capable of holding the movable branch wiring material W3 inserted into the movable branch space portion 35 of the movable branch unit 31 to the movable branch unit 31. The holding unit 32 of the present embodiment includes a rotating cover 36. The rotating cover 36 is rotatably supported relative to the side wall portion 30a of the movable branch unit 31, at an opening position and a closing position. The opening position of the rotating cover 36 is a position where a part of the movable branch space portion 35 of the movable branch unit 31 is opened. On the other hand, the closing position of the rotating cover 36 is a position where the part of the movable branch space portion 35 of the movable branch unit 31 is closed, and where the movable branch wiring material W3 is held in the movable branch space portion 35 of the movable branch unit 31. For example, the rotating cover 36 is joined to the side wall portion 30a of the movable branch unit 31 via a hinge 36a and the like. The hinge 36a forms a rotating axis along the certain direction, and rotatably supports the entire rotating cover 36 around the rotating axis relative to the side wall portion 30a. Moreover, the rotating cover 36 includes a locking claw 36b and the like, and is kept while the movable branch wiring material W3 is held in the movable branch space portion 35, when the locking claw 36b is locked to the side wall portion 30b of the movable branch unit 31 at the closing position. The rotating cover 36 closes the opening of a surface facing the bottom portion 30c of the movable branch space portion 35, while the rotating cover 36 is locked to the closing position. Moreover, the holding unit 32 is also used as a covering material holding unit for holding the end of the covering material C. In the holding unit 32, a plurality of holding rib parts 32a are formed on the inner wall surface at the movable branch space portion 35 side, on the end of the rotating cover 36 in the certain direction while the rotating cover 36 is placed at the closing position (end at the side opposite from the main space portion 11 side). In the side wall portions 30a and 30b and the bottom portion 30c, the holding rib parts 32a are formed on the inner wall surface at the movable branch space portion 35 side, in a portion facing the rotating cover 36 placed at the closing position. Each of the holding rib parts 32a is formed in a curved-shape corresponding to the outer peripheral shape of the covering material C, and holds the covering material C by being meshed with the uneven parts formed on the outer surface of the covering material C. In this example, the holding rib parts 32a are shaped so as to be able to hold the two covering materials C along a direction perpendicular to the certain direction with an interval therebetween. The holding unit 32 keeps the movable branch wiring material W3 in the movable branch unit 31 with the covering material C of the movable branch wiring material W3, via the holding rib parts 32a.

Figure 7:
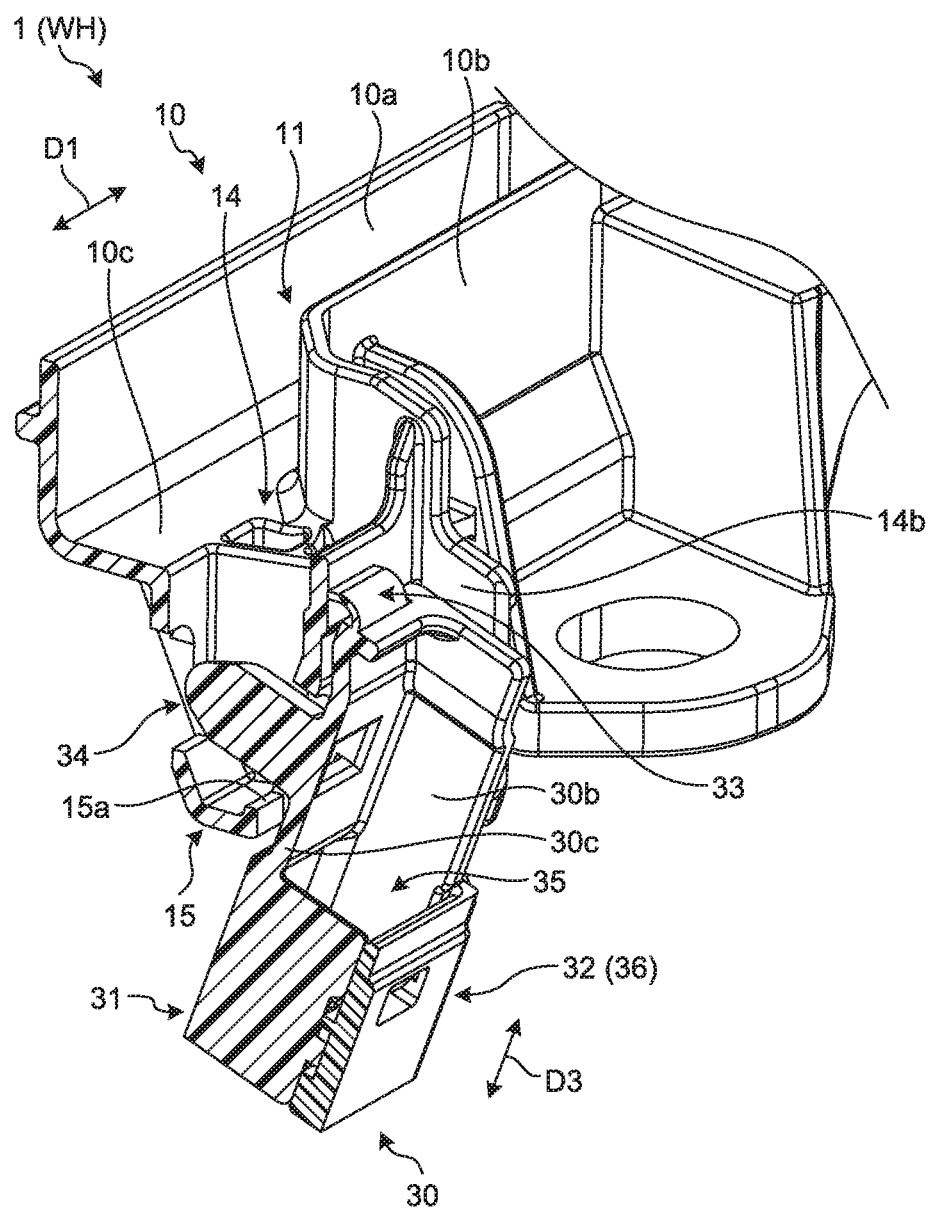
FIG. 7 is a partial sectional perspective view illustrating a schematic configuration of the movable wiring unit of the protector according to the embodiment.
Figure 8:
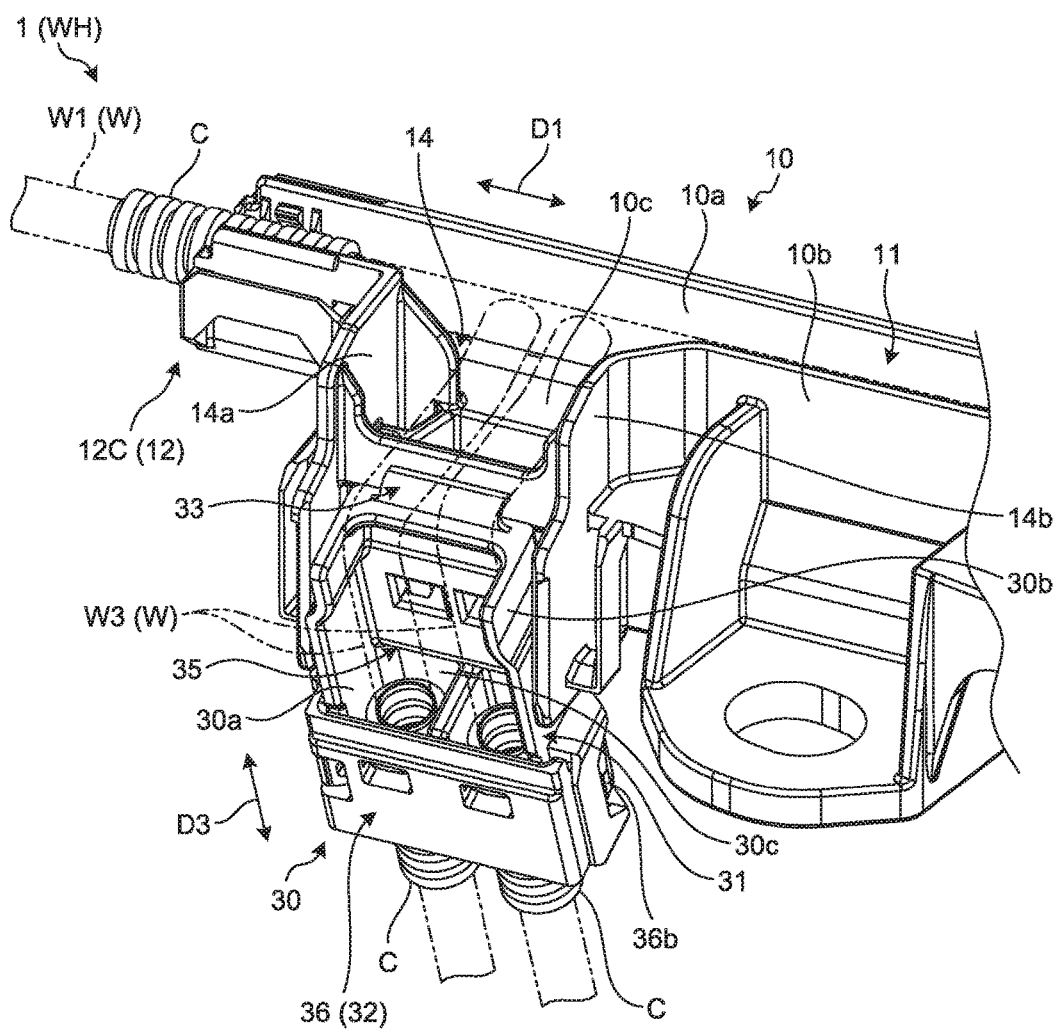
FIG. 8 is a partial perspective view illustrating a schematic configuration of the movable wiring unit of the protector according to the embodiment.

The rotation support unit 33 is a portion that rotatably supports the movable branch unit 31 relative to the main body unit 10 at the wiring position (see FIG. 2, FIG. 3, FIG. 4, FIG. 5, and FIG. 6) and the use position (FIG. 1, FIG. 7, and FIG. 8). The rotation support unit 33 is a rotation fulcrum of the movable branch unit 31. The rotation support unit 33 rotatably joins the main body unit 10 with the movable branch unit 31. In this example, the rotation support unit 33 rotatably joins the bottom portion 10c in the connection part 14 of the main body unit 10 with the bottom portion 30c of the movable branch unit 31. For example, the rotation support unit 33 is formed as a hinge, and forms a rotating axis along the first direction D1. The rotation support unit 33 rotatably supports the entire movable branch unit 31 around the rotating axis relative to the main body unit 10 with the holding unit 32, at the wiring position and the use position. As described above, the wiring position of the movable branch unit 31 is a position where the movable branch space portion 35 is placed along the second direction D2, and is the position where the movable branch wiring material W3 that is inserted into the movable branch space portion 35 is placed along the second direction D2. In other words, the wiring position of the movable branch unit 31 is a position where the extending direction of the movable branch space portion 35 and the wire direction of the movable branch wiring material W3 are along the virtual plane IP. Typically, the wiring position of the movable branch unit 31 is a position taken when the wiring material W is to be disposed in the protector 1 on the work surface such as the jig board. On the other hand, the use position of the movable branch unit 31 is a position where the movable branch space portion 35 is placed along the third direction D3, and is the position where the movable branch wiring material W3 that is inserted into the movable branch space portion 35 is placed along the third direction D3. In other words, the use position of the movable branch unit 31 is a position where the extending direction of the movable branch space portion 35 and the wire direction of the movable branch wiring material W3 intersect with the virtual plane IP in a three-dimensional manner, and typically, is the position taken when the wire harness WH is actually mounted on the vehicle to be used.

The fixing unit 34 is a portion that can fix the movable branch unit 31 to the main body unit 10 at the use position. The fixing unit 34 fixes the movable branch unit 31 to the main body unit 10 at the use position, when the movable branch unit 31 is locked to a projecting wall portion 15 formed on the main body unit 10, while the movable branch unit 31 is placed at the use position (in particular, see FIG. 7 and the like). The projecting wall portion 15 projects to a side opposite from the main space portion 11 side from the bottom portion 10c in the connection part 14 of the main body unit 10 (see FIG. 4, FIG. 5, FIG. 7, and the like). For example, the fixing unit 34 of the present embodiment is a clamp or the like projecting from the bottom portion 30c of the movable branch unit 31 toward the side opposite from the movable branch space portion 35 side. The fixing unit 34 fixes the movable branch unit 31 to the main body unit 10 at the use position, when the fixing unit 34 is inserted into a locking hole 15*a* formed in the projecting wall portion 15, and a locking claw 34*a* (see FIG. 4) is locked to the edge portion of the locking hole 15*a*.

The cover 40 is a member for covering and protecting the main body unit 10 and the movable wiring unit 30. The cover 40 includes a plurality of locking claws 40*a* (see FIG. 1), and is assembled to the main body unit 10 and the movable wiring unit 30, when the locking claws 40*a* are locked to the main body unit 10 and the movable branch unit 31. The cover 40 is assembled to the main body unit 10 and the movable wiring unit 30, after the wiring material W is disposed in the main body unit 10, the fixed wiring unit 20, and the movable wiring unit 30. Moreover, as described above, a part of the cover 40 is also used as the third holding unit 12C, while the cover 40 is assembled to the main body unit 10 and the movable wiring unit 30.

In the wire harness WH configured as the above, the wiring material W is disposed in the protector 1, while the movable branch unit 31 of the protector 1 is placed at the wiring position illustrated in FIG. 2, FIG. 3, FIG. 4, FIG. 5, and FIG. 6. In this case, in the wire harness WH, the main wiring material W1, the fixed branch wiring material W2, and the movable branch wiring material W3 are disposed in a two-dimensional manner, while the protector 1 is mounted on the work surface such as the jig board. In other words, in the protector 1, the main wiring material W1 is disposed in the main space portion 11 along the first direction D1, the movable branch wiring material W3 is disposed in the movable branch space portion 35 along the second direction D2, and the fixed branch wiring material W2 is disposed in the fixed branch space portion 23 along the fourth direction D4, while the movable branch unit 31 is placed at the wiring position, and the rotating covers 13, 24, and 36 are each at the opening position. In this process, the main wiring material W1, the fixed branch wiring material W2, and the movable branch wiring material W3 are disposed in the units of the protector 1 with the covering material C. In the protector 1, the rotating covers 13, 24, and 36 are each rotated to the closing position and locked to the unit at the closing position. Consequently, in the protector 1, the main wiring material W1, the fixed branch wiring material W2, and the movable branch wiring material W3 are held with the covering material C, while the main wiring material W1, the fixed branch wiring material W2, and the movable branch wiring material W3 are inserted into the main body unit 10, the fixed branch unit 21, and the movable branch unit 31, respectively. Then, in the wire harness WH, the movable branch unit 31 of the protector 1 is rotated to the use position illustrated in FIG. 1, FIG. 7, and FIG. 8, with the movable branch wiring material W3, and the wire direction of the movable branch wiring material W3 is set along the third direction D3. Then, in the protector 1, the movable branch unit 31 is fixed to the main body unit 10 at the use position, when the fixing unit 34 is inserted into the locking hole 15*a* formed on the projecting wall portion 15 of the main body unit 10 and the locking claw 34*a* is locked to the locking hole 15*a*, while the movable branch unit 31 is placed at the use position with the movable branch wiring material W3. The movable branch unit 31 is fixed to the main body unit 10 at the use position via the fixing unit 34, while the movable branch wiring material W3 is inserted into the movable branch space portion 35 of the movable branch unit 31 and is held in the movable branch unit 31 by the holding unit 32. Then, in the wire harness WH, the cover 40 is assembled to the main body unit 10 and the movable wiring unit 30.

In the protector 1 and the wire harness WH described above, the main wiring material W1 can be inserted into the main body unit 10 along the first direction D1, and the movable branch wiring material W3 can be inserted into the movable branch unit 31 along the second direction D2, while the movable branch unit 31 is placed at the wiring position. In this process, the protector 1 can prevent the deterioration of wiring workability, because the wiring work of the main wiring material W1 and the movable branch wiring material W3 to the protector 1 can be performed, while the main wiring material W1 and the movable branch wiring material W3 are mounted on the same virtual plane IP, typically, on the work surface such as the jig board. In the protector 1, the holding units 12 and 32 can keep the main wiring material W1 and the movable branch wiring material W3 in the main body unit 10 and the movable branch unit 31, while the movable branch unit 31 is placed at the wiring position. In this case, the protector 1 can easily make the holding unit 32 hold the movable branch wiring material W3, because the movable branch wiring material W3 is still along the second direction D2, and reaction force and the like caused by bending the movable branch wiring material W3 toward the third direction D3 side are not yet applied, for example. Then, the protector 1 can integrally rotate the entire movable branch unit 31 and the movable branch wiring material W3 to the use position via the rotation support unit 33, while the movable branch wiring material W3 is inserted into the movable branch unit 31 and is held by the holding unit 32. Then, the protector 1 can keep and fix the movable branch unit 31 and the movable branch wiring material W3, by fixing the movable branch unit 31 to the main body unit 10 at the use position by the fixing unit 34, while the movable branch unit 31 and the movable branch wiring material W3 are placed along the third direction D3. The movable branch unit 31 is fixed to the main body unit 10 at the use position via the fixing unit 34, while the movable branch wiring material W3 is inserted into the movable branch space portion 35 of the movable branch unit 31 and is held in the movable branch unit 31 by the holding unit 32. In other words, for example, the protector 1 can separately and independently perform the wiring work of the main wiring material W1 and the movable branch wiring material W3 to the main body unit 10 and the movable branch unit 31, the holding work of the movable branch wiring material W3 to the movable branch unit 31, the rotating work of the movable branch unit 31 and the movable branch wiring material W3, and the fixing work of the movable branch unit 31 and the movable branch wiring material W3. As a result, the protector 1 and the wire harness WH can improve the assembling workability of the protector 1 and the wiring material W.

In the protector 1 described above, the movable branch unit 31 is fixed to the use position after the main body unit 10, the fixed wiring unit 20, and the movable wiring unit 30 are integrally resin molded, as described above. With this configuration, for example, compared to when the movable branch unit 31 is molded so that the movable branch unit 31 is placed at the use position relative to the main body unit 10 from the beginning, the entire protector 1 can be resin molded without using what is called a slide structure in a resin molding mold. As a result, the protector 1 can prevent the structure of the resin molding mold from becoming complicated, and prevent the number of steps in the manufacturing operation from increasing. Thus, for example, it is possible to save the manufacturing cost.

Furthermore, in the protector 1 and the wire harness WH described above, the wiring work in the protector 1 can be performed while the fixed branch wiring material W2 is mounted on the same virtual plane IP, typically, on the work surface such as the jig board, in addition to the main wiring material W1 and the movable branch wiring material W3 as described above. The protector 1 and the wire harness WH can then rotate and fix only the movable branch wiring material W3 between the movable branch wiring material W3 and the fixed branch wiring material W2, at the position along the third direction D3 with the movable branch unit 31. In other words, even if the final branching direction relative to the main wiring material W1 may differ between the movable branch wiring material W3 and the fixed branch wiring material W2, the protector 1 can only fix the movable branch wiring material W3 in the branching direction that is different from that of the fixed branch wiring material W2 with the movable branch unit 31, after the movable branch wiring material W3 and the fixed branch wiring material W2 are disposed on the same work surface such as the jig board. With this configuration, the protector 1 and the wire harness WH can easily dispose the wiring material W in a three-dimensional manner as described above, by rotating the movable branch unit 31 to the use position with the movable branch wiring material W3, after disposing the wiring material W including the main wiring material W1, the fixed branch wiring material W2, and the movable branch wiring material W3, while the movable branch unit 31 is placed at the wiring position. In this case, the protector 1 and the wire harness WH can easily align and size the units, because the main wiring material W1, the fixed branch wiring material W2, and the movable branch wiring material W3 can be temporarily disposed in a two-dimensional manner, while mounting the main wiring material W1, the fixed branch wiring material W2, and the movable branch wiring material W3 on the same work surface such as the jig board. As a result, the protector 1 and the wire harness WH can improve the assembling workability.

Still furthermore, in the protector 1 and the wire harness WH described above, the movable branch unit 31 is placed at the use position after the movable branch wiring material W3 is held in the movable branch unit 31 by the holding unit 32, while the movable branch unit 31 is placed at the wiring position, as described above. With this configuration, the protector 1 and the wire harness WH can make the rotating cover 36 to be rotated and locked to the closing position, while the movable branch wiring material W3 is still along the second direction D2, and reaction force and the like caused by bending the movable branch wiring material W3 toward the third direction D3 side are not yet applied, for example. In this respect also, the protector 1 and the wire harness WH can improve the assembling workability.

The protector and the wire harness according to the embodiment of the present invention described above are not limited to the embodiment described above, and various modifications may be made within the spirit and scope of the appended claims.

The protector 1 described above includes the two fixed wiring units 20, and the single movable wiring unit 30. However, it is not limited thereto. For example, the protector 1 may not include the fixed wiring unit 20, or may include a plurality of the movable wiring units 30.

The holding unit 32 described above includes the rotating cover 36, and the movable branch wiring material W3 is kept in the movable branch unit 31 by the rotating cover 36. However, it is not limited thereto. For example, the holding unit 32 may include a cable tie or the like instead of the rotating cover 36, and the movable branch wiring material W3 may be kept in the movable branch unit 31 by using the cable tie.

The fixing unit 34 described above is what is called a clamp. However, it is not limited thereto. The fixing unit 34 may have other configurations as long as the movable branch unit 31 can be fixed to the main body unit 10 at the use position. The fixing unit 34 may also fix the movable branch unit 31 to the main body unit 10 at the use position, by forming various locking mechanism, such as a locking claw on a tip end portion of an arm-shaped member, and locking the locking claw to the main body unit 10.

In the description described above, the wire harness WH includes the covering material C, and the protector 1 holds the end of the covering material C. However, it is not limited thereto, and the wire harness WH may not include the covering material C.

The protector and the wire harness according to the present embodiment can insert the main wiring material into the main body unit along the first direction, and insert the movable branch wiring material into the movable branch unit along the second direction, while the movable branch unit is placed at the wiring position. The protector can hold the movable branch wiring material to the movable branch unit by the holding unit, while the movable branch unit is placed at the wiring position. Then, the protector can integrally rotate the entire movable branch unit and the movable branch wiring material to the use position via the rotation support unit, while the movable branch wiring material is inserted into the movable branch unit and is held by the holding unit. The protector can then keep and fix the movable branch unit and the movable branch wiring material, while the movable branch unit and the movable branch wiring material are placed along the third direction, by fixing the movable branch unit to the main body unit at the use position by the fixing unit. As a result, the protector and the wire harness can advantageously improve the assembling workability.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A protector, comprising:
   a main body unit that includes a main space portion formed along a first direction and into which a conductive main wiring material is capable of being inserted;
   a movable branch unit that includes a movable branch space portion communicated with the main space portion and into which a movable branch wiring material branched from the main wiring material is capable of being inserted;
   a holding unit that is capable of holding the movable branch wiring material inserted into the movable branch space portion to the movable branch unit;
   a rotation support unit that rotatably supports the movable branch unit relative to the main body unit, at a wiring position where the movable branch space portion is placed along a second direction that is different from the first direction and at a use position where the movable branch space portion is placed along a third direction that is different from the first direction and the second direction; and a fixing unit that is capable of fixing the movable branch unit to the main body unit at the use position.

2. The protector according to claim 1, further comprising:

a fixed branch unit that includes a fixed branch space portion communicated with the main space portion and into which a fixed branch wiring material branched from the main wiring material is capable of being inserted, and is fixed to the main body unit at a position where the fixed branch space portion is placed along a virtual plane that is placed along the first direction and the second direction.

3. The protector according to claim 1, wherein the holding unit includes a rotating cover that is rotatably supported relative to the movable branch unit, at an opening position where at least a part of the movable branch space portion is opened and at a closing position where the part of the movable branch space portion is closed and the movable branch wiring material along with a covering material of the movable branch wiring material are held to the movable branch unit.

4. The protector according to claim 2, wherein the holding unit includes a rotating cover that is rotatably supported relative to the movable branch unit, at an opening position where at least a part of the movable branch space portion is opened and at a closing position where the part of the movable branch space portion is closed and the movable branch wiring material along with a covering material of the movable branch wiring material are held to the movable branch unit.

5. The protector according to claim 1, wherein the movable branch unit is fixed to the main body unit at the use position via the fixing unit, in a state where the movable branch wiring material is inserted into the movable branch space portion and is held to the movable branch unit by the holding unit.

6. The protector according to claim 2, wherein the movable branch unit is fixed to the main body unit at the use position via the fixing unit, in a state where the movable branch wiring material is inserted into the movable branch space portion and is held to the movable branch unit by the holding unit.

7. The protector according to claim 3, wherein the movable branch unit is fixed to the main body unit at the use position via the fixing unit, in a state where the movable branch wiring material is inserted into the movable branch space portion and is held to the movable branch unit by the holding unit.

8. The protector according to claim 4, wherein the movable branch unit is fixed to the main body unit at the use position via the fixing unit, in a state where the movable branch wiring material is inserted into the movable branch space portion and is held to the movable branch unit by the holding unit.

9. A wire harness, comprising:

a conductive main wiring material;

a movable branch wiring material branched from the main wiring material; and a protector that is attached to the main wiring material and the movable branch wiring material, and that protects the main wiring material and the movable branch wiring material, wherein the protector includes:

a main body unit into which the main wiring material is inserted along a first direction;

a movable branch unit into which the movable branch wiring material is inserted;

a holding unit that holds the movable branch wiring material inserted into the movable branch unit to the movable branch unit;

a rotation support unit that rotatably supports the movable branch unit relative to the main body unit, at a wiring position where the movable branch wiring material is placed along a second direction that is different from the first direction and at a use position where the movable branch wiring material is placed along a third direction that is different from the first direction and the second direction; and a fixing unit that is capable of fixing the movable branch unit to the main body unit at the use position, and the movable branch unit is fixed to the main body unit at the use position via the fixing unit, in a state where the movable branch wiring material is inserted into the movable branch unit and is held to the movable branch unit by the holding unit.

* * * * *